(12) United States Patent
Clad et al.

(10) Patent No.: US 11,388,527 B2
(45) Date of Patent: Jul. 12, 2022

(54) HEARING AID SYSTEM COMPRISING A HEARING AID AND A CHARGING STATION, AND METHOD FOR ADJUSTING A SIGNAL PROCESSING PARAMETER

(71) Applicant: SIVANTOS PTE. LTD., Singapore (SG)

(72) Inventors: Lars Johan Clad, Nuremberg (DE); Umut Goekay, Koenigswinter (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/026,509

(22) Filed: Sep. 21, 2020

(65) Prior Publication Data

US 2021/0092529 A1 Mar. 25, 2021

(30) Foreign Application Priority Data

Sep. 20, 2019 (DE) .............................. 102019214381

(51) Int. Cl.
 H04R 25/00 (2006.01)
(52) U.S. Cl.
 CPC ......... H04R 25/30 (2013.01); *H04R 2225/33* (2013.01)
(58) Field of Classification Search
 CPC ...... H04R 25/00; H04R 25/55; H04R 25/558; H04R 25/602; H04R 2225/31; H04R 2225/33
 USPC ................................ 381/312, 314–315, 323
 See application file for complete search history.

(56) References Cited

U.S. PATENT DOCUMENTS

| 6,035,050 A | 3/2000 | Weinfurtner et al. |
| 7,735,996 B2 | 6/2010 | van der Zwan et al. |
| 8,265,315 B2 | 9/2012 | Sorensen et al. |
| 9,843,870 B2* | 12/2017 | Naumann ............... H04R 25/30 |
| 10,028,066 B2 | 7/2018 | Schmidt et al. |
| 2003/0128855 A1* | 7/2003 | Moller .................. H04R 25/556 381/314 |
| 2007/0104343 A1 | 5/2007 | Bengtsson et al. |
| 2013/0016861 A1 | 1/2013 | Kaempf |
| 2013/0127404 A1 | 5/2013 | Maenpaa |

(Continued)

FOREIGN PATENT DOCUMENTS

| CN | 105916088 A | 8/2016 |
| CN | 106255025 A | 12/2016 |

(Continued)

*Primary Examiner* — Suhan Ni
(74) *Attorney, Agent, or Firm* — Laurence A. Greenberg; Werner H. Stemer; Ralph E. Locher

(57) ABSTRACT

A hearing aid system includes a hearing aid with a rechargeable battery and a first data memory for storing operating data, and a charging station with a nonvolatile second data memory. The charging station charges the battery of the hearing aid at least intermittently while the hearing aid is arranged in a charging position. The hearing aid transmits operating data from the first data memory to the charging station when the hearing aid is arranged in a transmission position. The charging station stores operating data transmitted from the hearing aid in the second data memory, and the charging station transmits operating data stored in the second data memory to the hearing aid. A computer unit of the hearing aid adjusts at least one parameter relating to signal processing of the hearing aid based on the operating data transmitted from the charging station to the hearing aid.

7 Claims, 1 Drawing Sheet

(56) References Cited

U.S. PATENT DOCUMENTS

| | | |
|---|---|---|
| 2015/0281856 A1 | 10/2015 | Park et al. |
| 2016/0100261 A1* | 4/2016 | Shennib .............. H04R 25/602 |
| | | 381/323 |
| 2016/0249144 A1 | 8/2016 | Reinlein |
| 2020/0267483 A1* | 8/2020 | Schumaier ............. F26B 9/003 |

FOREIGN PATENT DOCUMENTS

| | | |
|---|---|---|
| DE | 102011107780 A1 | 1/2013 |
| DE | 102012218663 A1 | 4/2014 |
| EP | 0814634 A1 | 12/1997 |
| EP | 2178315 B1 | 5/2012 |
| WO | 2006126881 A2 | 11/2006 |
| WO | 2010081915 A2 | 7/2010 |

\* cited by examiner

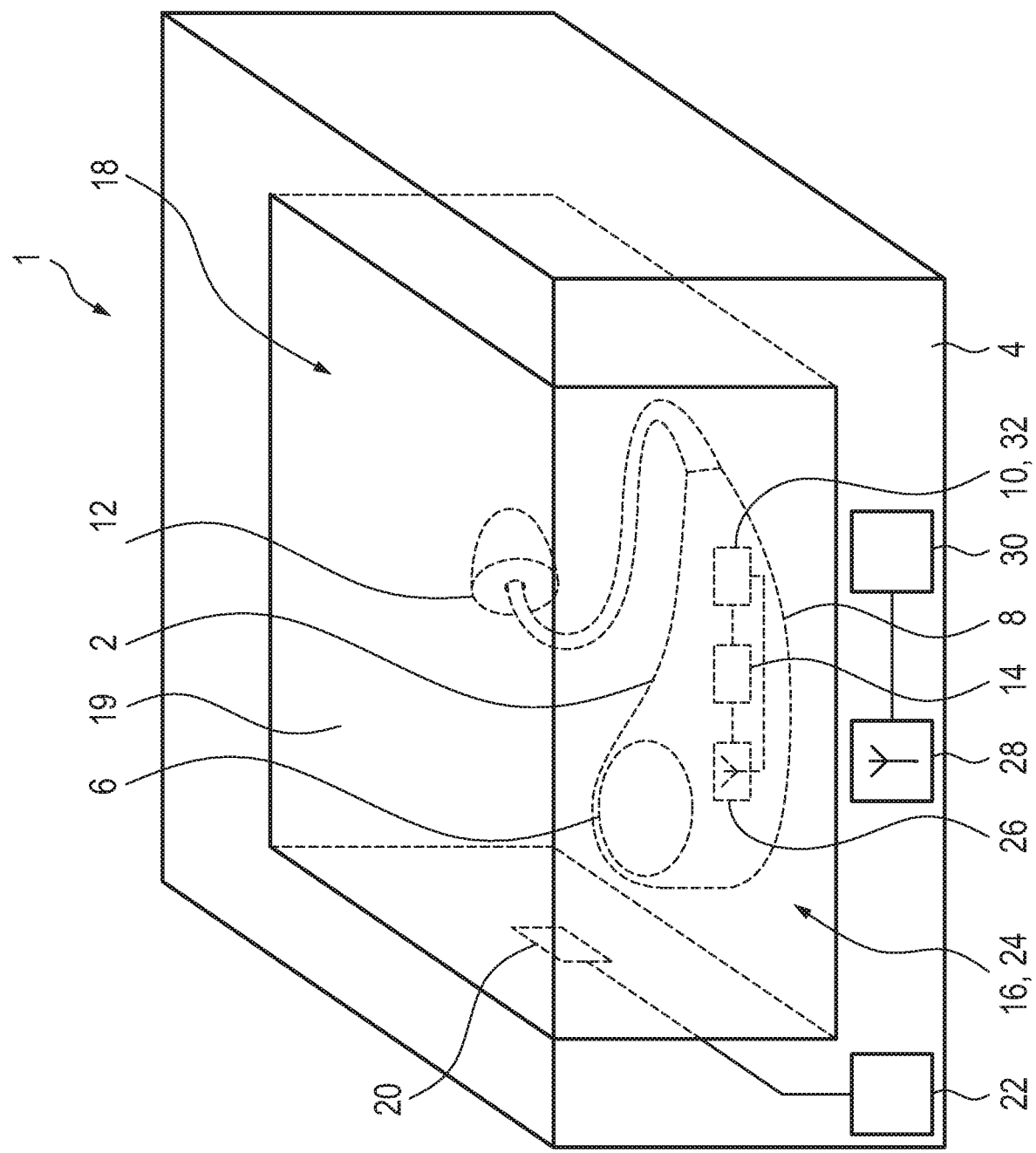

HEARING AID SYSTEM COMPRISING A HEARING AID AND A CHARGING STATION, AND METHOD FOR ADJUSTING A SIGNAL PROCESSING PARAMETER

CROSS-REFERENCE TO RELATED APPLICATION

This application claims the priority, under 35 U.S.C. § 119, of German patent application DE 10 2019 214 381, filed Sep. 20, 2019; the prior application is herewith incorporated by reference in its entirety.

BACKGROUND OF THE INVENTION

Field of the Invention

The present invention relates to a hearing aid system, comprising a hearing aid which comprises a rechargeable battery for supplying power, and comprising a charging station which is configured to charge the battery of the hearing aid at least intermittently if the hearing aid is arranged in a charging position with respect to the charging station. The present invention furthermore provides a method for adjusting at least one parameter relating to signal processing of a hearing aid.

A hearing aid is generally worn by a wearer for the purpose of at least partially compensating for a hearing deficiency. For this purpose, one or several input transducers, for example, in the form of microphones, are usually arranged in the hearing aid, which convert ambient sound into corresponding electrical input signals which are then processed as a function of the hearing deficiency to be corrected and are, inter alia, usually amplified as a function of frequency. The output signal of the signal processing which is customized to the wearer is then converted via an output transducer, usually in the form of a loudspeaker, into an output sound which is conveyed to the ear of the wearer.

A primarily important task of the hearing aid is, on the one hand, to pick up useful signal components in the ambient sound, for example, speech contributions, from background noise, in order thereby to improve the understandability of the respective useful signal for the wearer, and on the other hand, still to preserve a hearing impression which is as natural as possible; therefore, the signal processing is preferably not to result in artifacts or distortion. For this purpose, individual hearing situations are defined in the hearing aid as a group of standardized types for the aforementioned variables (in a corresponding parameter range), often depending on the type, level, and frequency response of the useful signal and the background noise, and various different hearing programs are stored in the hearing aid for this purpose, which match the individual parameters of the signal processing to the respective standardized hearing situation. By way of a user input, the wearer can also change the hearing program or adjust individual parameters of the signal processing if the default setting assigned to the hearing situation does not result in a satisfactory result for that specific wearer.

In order to minimize the number of changes which the user has to make to the parameters of the signal processing via user inputs over the service life of a hearing aid, learning algorithms can be used which systematize individual changes made by the wearer to the default settings of the parameters of the signal processing which are associated with a hearing situation or with generally determined acoustic measured values. A prediction can thereby be made for future hearing situations, as a function of the hearing situation and the change which was made. However, a pattern for the occurrence of feedback can be detected, for example, for controlling amplification factors, even without a user input, and this pattern can be taken into consideration for the future signal processing.

Such learning algorithms require an amount, or quantity of profile data which is as large as possible for automatically adjusting the parameters of the signal processing, i.e., in particular for determining a new default setting based on the previous profile of the parameters of the signal processing, as a function of the acoustic factors. However, it is often not possible for the hearing aid to provide a sufficient amount of these data, due to the highly limited physical space for data memory.

BRIEF SUMMARY OF THE INVENTION

It is accordingly an object of the invention to provide a hearing device system which overcomes the above-mentioned disadvantages of the heretofore-known devices and methods of this general type and which makes it possible to store larger quantities of operating data for a hearing aid, in a manner which is as simple and fully compatible as possible. The object of the present invention is furthermore to specify a method for adjusting parameters of the signal processing of a hearing aid, which is to be able to access operating data which is as comprehensive as possible.

With the above and other objects in view there is provided, in accordance with the invention, a hearing aid system, comprising a hearing aid having a rechargeable battery for supplying power and a first data memory for storing operating data; and a charging station having a nonvolatile second data memory, said charging station being configured to charge said battery of said hearing aid at least intermittently when said hearing aid is arranged in a charging position with respect to said charging station;

said hearing aid being configured to transmit operating data stored in said first data memory to said charging station when said hearing aid is arranged in a transmission position with respect to said charging station, and said charging station being configured to store the operating data transmitted from said hearing aid in said second data memory;

said charging station being configured to transmit operating data stored in said second data memory to said hearing aid when said hearing aid is arranged in the transmission position; and said hearing aid including a computer unit configured to adjust at least one parameter relating to signal processing of said hearing aid on a basis of the operating data transmitted from said charging station to said hearing aid.

In other words, the first-mentioned object is achieved according to the present invention by a hearing aid system with a hearing aid which comprises a rechargeable battery for supplying power and a first data memory for storing operating data, and a charging station which comprises a nonvolatile second data memory, wherein the charging station is configured to charge the battery of the hearing aid at least intermittently if the hearing aid is arranged in a charging position with respect to the charging station. The hearing aid is configured to transmit operating data stored in the first data memory to the charging station if the hearing aid is arranged in a transmission position with respect to the charging station. The charging station is configured to store operating data transmitted from the hearing aid in the second data memory. The charging station is furthermore configured to transmit operating data stored in the second data memory to the hearing aid when the hearing aid is arranged in the transmission position. The hearing aid furthermore comprises a computer unit which is configured to adjust at least one parameter relating to signal processing of the hearing aid, on the basis of the operating data transmitted from the charging station to the hearing aid.

The rechargeable battery is arranged in a housing of the hearing aid in particular during operation of the hearing aid, and is preferably charged via a corresponding connection to the hearing aid for transmitting energy, without having to remove the battery from the housing for this purpose. The term "rechargeable battery" is to be understood to mean in particular such a battery which is configured to draw and to store electrical energy supplied in a suitable manner, and to deliver the stored energy to a load if the electrical load is applied in a circuit comprising the battery, wherein in particular a plurality of charging processes is possible until reaching a maximum energy capacity of the battery and a subsequent full or partial discharge.

Preferably, for charging the battery, the hearing aid and the charging station are correspondingly configured for establishing a connection for energy transmission from the charging station to the hearing aid if the hearing aid is arranged in the charging position, and are correspondingly also configured for establishing a data connection for transmitting the operating data from the hearing aid to the charging station if the hearing aid is arranged in the transmission position.

In particular, the hearing aid is arranged in a charging position with respect to the charging station in that it is connected to a charging plug of the charging station, or is inserted into a corresponding charging chamber or is laid on a charging plate for wireless charging. The transmission position may in particular be identical to the charging position, and the energy transmission from the charging station to the hearing aid for charging the battery preferably takes place in the same manner as the transmission of the operating data from the hearing aid to the charging station, i.e., for example, via galvanic contacts, a common charging and data cable, or via a charging cable and a data cable which is isolated from said charging cable, or via a wireless data connection having a corresponding transmission protocol (for example, NFC or Bluetooth) and inductive energy transmission for wireless charging (for example, Qi charging). In addition to conventional energy sources such as a socket, the energy can also be provided by a mobile energy source, for example, a power bank, a smartphone, a laptop, or an energy converter, for example, a solar cell module.

In particular, the charging position is thus provided by means of a spatial arrangement of the hearing aid relative to the charging station, and by means of a connection for transmitting energy, or, in the case of wireless energy transmission, by means of the spatial arrangement of the hearing aid in such a way that the energy transmission is made possible. Analogously thereto, the transmission position is provided in particular by means of a spatial arrangement of the hearing aid relative to the charging station, and by means of a connection for transmitting data, or, in the case of wireless data transmission, by means of the spatial arrangement of the hearing aid, in such a way that the data transmission is made possible.

The second data memory is in particular physically integrated into the charging station, i.e., in addition to the components required for charging the battery of the hearing aid (i.e., in particular components for preparing voltage and transmitting energy to a hearing aid arranged in the charging position), the second data memory is also an integral component of the charging station. The charging station preferably comprises a housing which encloses all aforementioned electronic components, possibly with the exception of a network adapter and/or cable for connecting to a power network.

The term "to charge at least intermittently" is in particular to be understood to mean a charging process in which, in order to ensure that the energy transmission is as optimal as possible, and/or to ensure that the service life of the battery is as long as possible, strictly continuous charging of the battery does not take place, but rather, possibly brief pauses in the process of supplying energy to the battery can take place, wherein an increase in the energy stored in the battery takes place by means of the charging, averaged over the total period of time in which the hearing aid is arranged in the charging position with respect to the charging station. The hearing aid may in particular be arranged in the charging position for several hours, for example, throughout the night, while the energy feed-in for charging the battery itself is substantially shorter (for example, on the order of minutes).

The first data memory may in particular be designed as a nonvolatile memory in the hearing aid, in particular physically implemented in a central nonvolatile main memory of the hearing aid, in which an operating system as well as basic functions and acoustic settings of the hearing aid are also stored. Thus, operating data may then also be stored in the first memory if the hearing aid is switched off during a pause in operation, for example, at night, but is not put into the charging and transmission position. Alternatively, the first data memory may be designed as a volatile memory of the hearing aid, for example, as a RAM (random access memory), which is also usable for the algorithmic operations for the signal processing during the ongoing operation of the hearing aid. In this case, operating data which are stored in the first data memory are to be transmitted to the second data memory of the charging station before switching off the hearing aid, in order to protect the operating data from loss.

The hearing aid is designed in particular to store a piece of information about an existing hearing situation, a piece of information about the occurrence of acoustic feedback at the hearing aid, acoustic measurement data collected by the hearing aid, a user input, in particular an input about a user preference with respect to the signal processing for an existing hearing situation, an error message, and/or an existing value of a parameter relating to the signal processing of the hearing aid, as operating data. Here and below, in particular a possibly frequency-dependent amplification factor, a possibly frequency-dependent directional parameter of directional microphony, a possibly frequency-dependent parameter of feedback suppression, and other parameters which actively control the signal processing of the hearing aid, are comprised as a parameter relating to the signal processing. The operating parameters thus comprise in particular the parameters of the signal processing which directly actuate a change in an audio signal in the hearing aid, and other parameters which describe the hearing situation and/or the acoustic environment, and as a function of which the corresponding parameters of the signal processing are adjusted in the hearing aid.

When the hearing aid is placed in the charging position for charging and is preferably also in the transmission position, the operating data stored in the first data memory may be transmitted from the hearing aid to the charging station and stored there in the second data memory, simultaneously to the charging process or with a time delay, i.e., during pauses in the energy transmission or the like. Thus, it is still possible to store the operating data in the first data memory of the hearing aid, which is generally moderately sized as a result of the limited space, in a quantity which is sufficient or advantageous for subsequent automated learning processes, since, with each charging process, the respectively most current operating data, i.e., in particular information about individual hearing situations or acoustic scenarios, and corresponding signal parameter values and associated inputs or desired settings of the wearer of the hearing aid, can be stored in the second data memory arranged in the charging station.

The charging station is furthermore configured to transmit operating data stored in the second data memory to the hearing aid if the hearing aid is arranged in the transmission position. This means that if the hearing aid is arranged in the transmission position in or at the charging station, not only may current operating data stored in the first data memory of the hearing aid be transmitted to the charging station, but conversely, older operating data which were transmitted to the second data memory and stored there during previous charging processes may also be transmitted back to the hearing aid for adjustment and/or processing. This allows in particular using the computing resources of the hearing aid for such an adjustment.

The hearing aid comprises a computer unit which is configured to adjust at least one parameter relating to signal processing of the hearing aid, with the aid of operating data transmitted from the charging station to the hearing aid. Preferably, the adjusted parameter of the signal processing is subsequently stored in a nonvolatile data memory of the hearing aid, which in particular can also be provided by the first data memory if said data memory is designed as a nonvolatile data memory. This allows using the computing resources of the hearing aid, i.e., in particular a processor unit provided for the signal processing, for adjusting the at least one parameter of the signal processing, as a function of the operating parameters stored in the second data memory. As a result, the provision of independent computing power by the charging station in the form of processor power of a corresponding computer and/or processor unit may be omitted for such an adjustment, thus having a cost-saving effect on the design of the charging station.

An automatic adjustment of the individual hearing programs, and generally of the settings of parameters of the signal processing as a function of the acoustic ambient situation, may then take place on the basis of the operating data which are stored in the second data memory, and which can provide an advantageous, long-term user history for this adjustment if the second data memory is sized sufficiently. This adjustment preferably takes place by means of a machine learning algorithm, and makes use of the native computing capacity of the hearing aid, in that the comprehensive operating data of the second data memory are transmitted to a hearing aid arranged in the charging and transmission position, and are processed there in a computing unit for adjustment. For the adjustment, the available memory capacity of the hearing aid, in particular of the first data memory, is preferably used as a random-access memory which is addressed by the computing capacity of the hearing aid for carrying out the adjustment.

Preferably, the hearing aid is configured to store data from the following list of data types as operating data: acoustic measurement data collected by the hearing aid; a user input, in particular an input of a user preference with respect to the signal processing for an existing hearing situation; a piece of information about a technical state of the hearing aid; an existing value of a parameter relating to signal processing of the hearing aid; a piece of temporal information; a piece of information with respect to an external device which is situated in the vicinity of the hearing aid; an evaluation of collected information.

This allows a particularly efficient adjustment of a parameter of the signal processing, on the basis of operating parameters stored in the second data memory. In particular, at least one value of a parameter of the signal processing and one additional piece of information about the hearing situation and/or with respect to the ambient sound are stored as operating data, wherein the storage preferably assigns the at least one parameter of the signal processing to the aforementioned piece of information.

A piece of information about a technical state comprises in particular an error message and/or a test result of a self-check of the hearing aid or individual components or subsystems and/or log files. An existing value of a parameter relating to signal processing of the hearing aid also comprises in particular an adjusted hearing aid program, a specific value of applied, possibly frequency-based amplification, noise suppression or directivity, a piece of information about the use of own-voice detection, and the like. Acoustic measurement data collected by the hearing aid comprise in particular a piece of information about an existing hearing situation and/or a piece of information about the occurrence of acoustic feedback at the hearing aid; a piece of information with respect to a device situated in the vicinity of the hearing aid comprises in particular a piece of information about the type of such an external device and about coupling which has taken place with the external device, and possibly the extent to which an exchange of information between the hearing aid and the external device took place.

A piece of temporal information comprises in particular a wearing period of the hearing aid and/or a point in time at which another piece of information which was also stored was collected. An evaluation of collected information comprises in particular hearing effort detected on the basis of collected sensor data and the like, or other data about the physical condition of the wearer. Such sensor data comprise in particular a value of a body temperature, an ambient temperature, a blood pressure, a pulse, and may be collected by the hearing aid itself and/or by an external device, for example, a body-worn network or a smartwatch, and transmitted to the hearing aid, and stored in addition to the first operating data.

Advantageously, the charging station is configured to charge the battery of the hearing aid by means of wireless, in particular inductive, energy transmission to the hearing aid. The method is particularly advantageous for wireless energy transmission, since the charging position can thereby be achieved by laying the hearing aid on a corresponding charging plate of the charging station, or by inserting the hearing aid into a charging chamber having a number of charging plates. In particular in combination with corresponding wireless data transmission in the transmission position which is preferably provided by the charging position, a particularly convenient way is thus made possible for the wearer to transmit the operating data to the second data memory for long-term or permanent backup. In a further advantageous embodiment, the charging station is configured to charge the battery of the hearing aid by means of galvanic coupling for transmitting energy to the hearing aid.

Advantageously, the hearing aid is configured to transmit operating data stored in the first data memory to the charging station wirelessly, in particular via Bluetooth and/or via a comparable data transmission protocol. As a result, the wearer does not have to connect a separate cable to the hearing aid for transmitting the operating data from the hearing aid to the charging station, thus resulting in convenient execution of the method. In a further advantageous embodiment, the hearing aid is configured to transmit operating data stored in the first data memory by means of galvanic coupling for transmitting data to the charging station.

It is furthermore advantageous if the charging station is configured to transmit the operating data stored in the second data memory to the hearing aid wirelessly, in particular via Bluetooth and/or via a comparable data transmission protocol. In particular, the same connection, i.e., the same wireless transmission protocol, for example, Bluetooth or the like, may be used as for transmitting the operating data of the first data memory from the hearing aid to the charging station. As a result, the complexity of the system is kept low, since no additional components are required in the hearing aid or in the charging station for the transmission. However, a variant having different transmission protocols may be advantageous if the stability of a transmission between the hearing aid and the charging station is not sufficiently high to achieve the transmission in both directions via only one connection or one transmission protocol.

In another embodiment, the charging station also comprises a computer unit which is configured to adjust at least one parameter relating to signal processing of the hearing aid, on the basis of the operating data transmitted from the hearing aid to the charging station, wherein the charging station is configured to transmit the adjusted parameter of the signal processing to the hearing aid. In particular, at least one first parameter of the signal processing is adjusted on a computer unit of the hearing aid, and at least one second parameter of the signal processing is adjusted on the computer unit of the charging station. Preferably, the adjusted parameter of the signal processing is subsequently stored in a nonvolatile data memory of the hearing aid, which in particular can also be provided by the first data memory if said data memory is designed as a nonvolatile data memory. This is advantageous in particular for the case of a particularly compact hearing aid having comparatively moderate computing power. In this case, at least parts of the adjustment may also be carried out in the computer unit of the charging station.

In an alternative embodiment, the present invention provides a hearing aid system, comprising a hearing aid which comprises a rechargeable battery for supplying power and a first data memory for storing operating data, and a charging station which comprises a nonvolatile second data memory, wherein the charging station is configured to charge the battery of the hearing aid at least intermittently if the hearing aid is arranged in a charging position with respect to the charging station, wherein the hearing aid is configured to transmit operating data stored in the first data memory to the charging station if the hearing aid is arranged in a transmission position with respect to the charging station, wherein the charging station is configured to store operating data transmitted from the hearing aid in the second data memory, wherein the charging station is furthermore configured to transmit operating data stored in the second data memory to the hearing aid if the hearing aid is arranged in the transmission position, wherein the charging station comprises a computer unit which is configured to adjust at least one parameter relating to signal processing of the charging station, on the basis of the operating data transmitted from the hearing aid to the charging station, wherein the charging station is configured to transmit the adjusted parameter of the signal processing to the hearing aid. In particular, this hearing system may have other advantageous features of the type described above.

The present invention furthermore provides a charging station for a hearing aid, which comprises a nonvolatile data memory and which is configured to charge a rechargeable battery of a hearing aid at least intermittently if the hearing aid is arranged in a charging position with respect to the charging station, to receive operating data from the hearing aid and to store said data in the data memory if the hearing aid is arranged in a transmission position, and to transmit operating data stored in the data memory to the hearing aid if the hearing aid is arranged in a transmission position. The advantages specified for the hearing aid system and for its refinements may analogously be assigned to the charging station.

With the above and other objects in view there is also provided, in accordance with the invention, a method of adjusting at least one parameter relating to a signal processing of a hearing aid, the method comprising:

during a first operating phase of the hearing aid, storing first operating data in a first data memory of the hearing aid;

during a first charging phase of the hearing aid, at least intermittently charging a rechargeable battery in the hearing aid by way of a charging station;

during the first charging phase, transmitting at least a first partial data set of the first operating data stored in the first data memory of the hearing aid to a nonvolatile second data memory of the charging station;

during a second charging phase of the hearing aid, at least intermittently charging the rechargeable battery in the hearing aid by way of the charging station, and transmitting at least a second partial data set of the first operating data from the second data memory to the hearing aid; and adjusting the first operating data of the at least one parameter of the signal processing based on the second partial data set.

In other words, the second-mentioned object is achieved according to the present invention by a method for adjusting at least one parameter relating to signal processing of a hearing aid, wherein during a first operating phase of the hearing aid, first operating data are stored in a first data memory of the hearing aid, wherein during a first charging phase of the hearing aid, a rechargeable battery in the hearing aid is charged at least intermittently by means of a charging station, wherein during the first charging phase, at least a first partial data set of the first operating data stored in the first data memory of the hearing aid is transmitted to a nonvolatile second data memory of the charging station, wherein during a second charging phase of the hearing aid, the rechargeable battery in the hearing aid is charged at least intermittently by means of the charging station, and at least a second partial data set of the first operating data is transmitted from the second data memory to the hearing aid, and wherein, on the basis of the second partial data set, an adjustment is made to first operating data of the at least one parameter of the signal processing. The adjustment takes place in particular by means of a computer unit arranged in the hearing aid. This process allows an advantageous use of the computing resources of the hearing aid, such that the charging station does not specifically have to be equipped with a corresponding computer unit.

The hearing aid system according to the present invention shares the advantages of the method according to the present invention. The advantages mentioned for the hearing aid system and for its refinements may thus be applied to the method.

Preferably, during the first charging phase, substantially all first operating data stored in the first data memory of the hearing aid are transmitted to the nonvolatile second data memory of the charging station. This makes it possible to delete the first operating data from the first data memory, such that said data memory can be used as random access memory which is addressable by means of the native computing capacity of the hearing aid, for adjusting the at least one parameter of the signal processing in the hearing aid.

It is advantageous if second operating data are stored in a first data memory of the hearing aid during a second operating phase of the hearing aid, wherein the at least one parameter of the signal processing is adjusted to first operating data on the basis of the second partial data set, and on the basis of at least a second partial data set of the second operating data, by means of a computer unit of the hearing aid. As a result, the parts of the first operating data last stored in the hearing aid may be used for the adjustment, without having to be transmitted to the charging station.

Advantageously, acoustic measurement data collected by the hearing aid, a user input, a piece of information about a technical state of the hearing aid, an existing value of a parameter relating to signal processing of the hearing aid, a piece of temporal information, a piece of information with respect to an external device which is situated in the vicinity of the hearing aid, and/or an evaluation of collected information, are stored as the first and preferably as the second operating data.

Other features which are considered as characteristic for the invention are set forth in the appended claims.

Although the invention is illustrated and described herein as embodied in a hearing aid system with a hearing aid and a charging station, and also a related method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing depicts a hearing aid system comprising a hearing aid and a charging station, with the charging station including a data memory for the long-term storage of operating data of the hearing aid.

DETAILED DESCRIPTION OF THE INVENTION

The FIGURE schematically depicts a partially transparent oblique view of a hearing aid system 1 which comprises a hearing aid 2 and a charging station 4. The hearing aid 2 of the illustrated exemplary embodiment is a behind-the-ear (BTE) device; it will be understood, however, that other current designs such as ITE, RIC, CIC, and the like, are also conceivable. The hearing aid comprises a rechargeable battery 6 for supplying power, which is arranged in the housing 8 of the hearing aid 2. Furthermore, the hearing aid 2 comprises, in a manner which is not depicted in greater detail, at least two input transducers for generating corresponding input signals from ambient sound, and an output transducer for generating output sound based on an output signal which is generated by a signal processing unit 10 of the hearing aid, based on the input signals, as a function of a hearing deficiency of the wearer which is to be corrected. The output signal is introduced into an earpiece 12 during the operation of the hearing aid 2, in order to be conveyed to the ear of the wearer by means of said earpiece. In particular, the input transducers may respectively be provided by a microphone, and the output transducer may be provided by a loudspeaker. If the hearing aid 2 is implemented in a design other than the depicted BTE form, other forms are also possible for the output transducer, for example, in the form of a bone conduction hearing aid, and designs having only one input transducer. The hearing aid furthermore comprises a first data memory 14 in which operating data are continuously stored during operation, and which is preferably equipped as a nonvolatile memory. In particular, the first data memory 14 may be implemented in a nonvolatile central memory (not depicted) of the hearing aid 2, in which an operating system and other data which are relevant for the function and the operation of the hearing aid are also stored.

The user-specific signal processing for compensating for a hearing deficiency of the wearer takes place in the hearing aid in most cases in such a way that the parameters for the signal processing to be used on the input signals, i.e., for example, frequency-dependent amplification factors and compression ratios, as well as corresponding time constants, angle and directional parameters for forming directional signals, parameters for suppressing background noise or acoustic feedback, etc., are generated dynamically as a function of the input signals. An analysis of the input signals is performed with respect to an existing hearing situation, wherein a hearing situation essentially standardizes actual acoustic environmental situations with respect to the type and number of useful signal sources, and with respect to the type and intensity of the background noise.

In a similar actual environmental situation, for example, a conversation with an interlocutor in a "noisy" environment with background noise which is partly diffuse, partly tonal and directed, wherein in one case, the noise is provided by street noise, and in the other case, by noise in a restaurant, the same hearing situation is thus determined, and on the basis thereof, corresponding standardized parameters of the signal processing are adjusted. Additional adjustments of the parameters may take place within a hearing program which is associated with a specific hearing situation, as a function of the input signals and thus the ambient sound. Thus, for example, a compression ratio may be increased or the associated response time may be decreased if an interlocutor tends to speak briefly and in a very loud, boisterous manner, thus possibly causing the output sound of the hearing aid 2 to be unpleasantly loud for its wearer.

Moreover, by means of a user input, the wearer can, however, correct the hearing programs which are automatically determined based on the acoustic environmental situation, as well as individual parameters of the signal processing, or at least confirm a recommendation of the signal processing, for example, via a dedicated remote control for the hearing aid 2, via a corresponding application on a mobile telephone, or via operating elements on the hearing aid 2 itself which will not be depicted in greater detail.

On the one hand, all acoustic measurement data may then be stored in the first memory 14 as operating data of which an analysis resulted in a specific hearing situation, as well as the user inputs made in this regard by the wearer with respect to the selection of a hearing program associated with the hearing situation, and with respect to the parameter values of the signal processing (for example, lowering of a maximum loudness while retaining the hearing program) which were preset in the hearing program. On the one hand, such storage may always take place if a user input takes place, or, based on the absence of a user input, it may also be concluded that the wearer is satisfied with the preset hearing program and the parameters thereof. In order also to make this information usable for an automatic adjustment, the operating data may be stored at regular intervals and/or with each newly ascertained hearing situation or significant change in the acoustic environmental situation.

The hearing aid 2 is in a charging position 16 with respect to the charging station 4, which is provided by the hearing aid 2 being positioned in a charging chamber 18 of the charging station 4 which can be closed by a lid 19. In this charging position 16, the hearing aid 2 is configured to receive energy via an inductive transformer 20 of the charging station 4 which is fed by the power source 22 of the charging station 4, in order thereby to charge the battery 6. For this purpose, the hearing aid 2 may comprise an inductive receiver, in a manner which is not depicted, for receiving the energy which is output by the inductive transformer 20. The power source 22 may generally comprise any source which is capable of providing suitable power for charging the battery 6 of the hearing aid 2, in particular also a corresponding power transformer which is connected to a power supply (not depicted) of the charging station 4, or the like.

In addition, in the depiction according to the FIGURE, the hearing aid 2 is also situated in a transmission position 24 with respect to the charging station 4, wherein the transmission position 24 is presently identical to the charging position 16, and it is thus provided that the hearing aid 2 is inserted into the charging chamber 18. The hearing aid 2 comprises an antenna 26 which, inter alia, is connected to the first data memory 14, and which is configured to transmit the operating data which are stored there during the operation of the hearing aid 2 to a corresponding antenna 28 of the charging station, from which said data are stored on a nonvolatile second data memory 30 of the charging station 4. The transmission may take place, for example, by means of Bluetooth or the like.

However, embodiments of the charging position 16 and the transmission position 24 which are different from one another are also conceivable, for example, in the case that the energy transmission for charging the battery 6 and the transmission of the operating data between the hearing aid 2 and the charging station 4 are implemented by means of a charging cable and a transmission cable which is isolated from said charging cable. In this case, the charging position 16 or the transmission position 24 is in particular provided by a connection of the corresponding cable from the hearing aid 2 to the charging station 4.

Thus, in the charging and transmission position 16 and 24 of the hearing aid 2, on the one hand, charging of the battery 6 may take place, and on the other hand, transmission of the operating data from the first memory 14 of the hearing aid 2 to the second memory 30 of the charging station 4 may take place via the antennas 26 and 28, either simultaneously, or with a time delay, and thus at points in time at which energy transmission via the inductive transformer 20 is temporarily paused. The operating data transmitted by the hearing aid 2 are stored in the second data memory 30.

After successful storage in the second data memory 30, a corresponding confirmation signal may be transmitted from the charging station 4 to the hearing aid 2, for example, via the two antennas 26, 28, so that the successful backup of the operating data in the second data memory 30 can be used by the hearing aid 2 to free up memory space in the first data memory 14 for storing operating data of a subsequent operating phase. Since the second data memory 30 is arranged in the charging station 4, it can be sized substantially larger than the first data memory 14, which is subject to the spatial limitations of the hearing aid 2. Thus, a long-term history of operating data can be stored in the second data memory 30, which can be used for adjusting the signal processing of the hearing aid 2.

For this purpose, the comprehensive operating data which are stored in the second data memory 30 may be transmitted via the antennas 28 and 26 from the charging station 4 to the hearing aid 2 while said hearing aid is arranged in the transmission position 24, wherein this transmission may take place preferably before the transmission of the operating data stored in the first memory of the hearing aid 2 to the charging station 4, or afterwards. A simultaneous transmission by means of a corresponding bidirectional transmission protocol is also conceivable.

The operating data of the second data memory 30, which have now been transmitted to the hearing aid 2, can be used there to adjust individual parameters of the signal processing on a computer unit 32 on which the signal processing unit 10 is preferably also physically implemented. For example, a frequency-dependent amplification or compression and the like, in particular an association with an ascertained hearing situation or with other acoustic measurement data which can be gathered from the input signals, and on the basis of which signal processing typically takes in the hearing aid 2, may be adjusted as parameters. The adjusted parameters are then stored in a nonvolatile memory of the hearing aid 2, such that the adjusted parameters are used for the signal processing in an operating phase following this adjustment. The aforementioned nonvolatile memory may in particular be physically implemented in the same memory in which the first data memory 14 is also implemented.

An alternative design of the adjustment is also conceivable, in which parts of the adjustment are carried out on a computer unit, or processor, of the charging station 4 which is specifically provided therefor, in order to transmit the adjusted parameters subsequently to the hearing aid 2. Carrying out the computing steps necessary for the adjustment on the computer unit 32 of the hearing aid 2 has the advantage that a separate computer unit is thereby not required in the charging station 4. However, additional computer capacity on the charging station 4 may accelerate the adjustment.

Carrying out the computing steps on such a computer unit in the charging station 4 also has the advantage that it can also take place in particular offline, i.e., at a point in time at which the hearing aid is not arranged in the transmission position 24. Thus, in particular when arranging the hearing aid 2 in the transmission position 24, a set of fully adjusted parameters of the signal processing can first be transmitted from the charging station 4 to the hearing aid 2, so that these parameters are available to the wearer for operation as quickly as possible after positioning the hearing aid in the transmission position 24, in the event that a charging and transmission process has to be interrupted because the hearing aid 2 is unexpectedly needed. Following the transmission of the adjusted parameters from the charging station 4 to the hearing aid 2, the most current operating data stored in the first memory 14 are then transmitted by said hearing aid to the charging station 4 for storage in the second data memory 30.

Although the present invention was illustrated and described in detail via the preferred exemplary embodiment, the present invention is not limited by this exemplary embodiment. Other variations may be derived from it by those skilled in the art without departing from the scope of protection of the present invention.

The following is a summary list of reference numerals and the corresponding structure used in the above description of the invention:

1 Hearing aid system
2 Hearing aid
4 Charging station
6 Battery
8 Housing (of the hearing aid)
10 Signal processing unit
12 Earpiece
14 First data memory
16 Charging position
18 Charging chamber
19 Lid
20 Inductive transformer
22 Power source
24 Transmission position
26 Antenna (of the hearing aid)
28 Antenna (of the charging station)
30 Second data memory
32 Computer unit

The invention claimed is:

1. A hearing aid system, comprising:
a hearing aid having a rechargeable battery for supplying power and a first data memory for storing operating data; and
a charging station having a nonvolatile second data memory, said charging station being configured to charge said battery of said hearing aid at least intermittently when said hearing aid is arranged in a charging position with respect to said charging station;
said hearing aid being configured to transmit a first partial data set of first operating data stored in said first data memory to said charging station when said hearing aid is arranged in a transmission position with respect to said charging station during a first charging phase, and said charging station being configured to store the first operating data transmitted from said hearing aid in said second data memory;
said charging station being configured to transmit a second partial data set of first operating data stored in said second data memory to said hearing aid when said hearing aid is arranged in the transmission position during a second charging phase; and
said hearing aid including a computer unit configured to adjust at least one parameter relating to signal processing of said hearing aid on a basis of the second partial data set of first operating data transmitted during said second charging phase from said charging station to said hearing aid.

2. The hearing aid system according to claim 1, wherein said hearing aid is configured to store data selected from the following list of data types as operating data: acoustic measurement data collected by said hearing aid, a user input, a piece of information about a technical state of said hearing aid, an existing value of a parameter related to the signal processing of said hearing aid, a piece of temporal information, a piece of information created with respect to an external device which is situated in a vicinity of said hearing aid, and an evaluation of collected information.

3. The hearing aid system according to claim 1, wherein said charging station is configured to charge said battery of said hearing aid by way of wireless energy transmission to said hearing aid.

4. The hearing aid system according to claim 1, wherein said charging station is configured to charge said battery of said hearing aid by way of galvanic coupling for transmitting energy to said hearing aid.

5. The hearing aid system according to claim 1, wherein said hearing aid is configured to transmit operating data stored in said first data memory wirelessly to said charging station.

6. The hearing aid system according to claim 1, wherein said charging station is configured to transmit the operating data stored in said second data memory wirelessly to said hearing aid.

7. The hearing aid system according to claim 1, wherein said hearing aid is configured to transmit the operating data stored in said first data memory by way of galvanic coupling for transmitting data to said charging station.

* * * * *